United States Patent
Lieberman et al.

(10) Patent No.: US 9,704,183 B2
(45) Date of Patent: Jul. 11, 2017

(54) SYSTEM AND METHOD FOR GENERATING AND MANAGING INTERACTIVE ADVERTISEMENTS

(75) Inventors: Todd Lieberman, Haverford, PA (US); Ari Jacoby, New York, NY (US); Jeff Weisberg, Philadelphia, PA (US)

(73) Assignee: SOLVE MEDIA, LLC, Somerville, NJ (US)

( * ) Notice: Subject to any disclaimer, the term of this patent is extended or adjusted under 35 U.S.C. 154(b) by 1506 days.

(21) Appl. No.: 12/917,948

(22) Filed: Nov. 2, 2010

(65) Prior Publication Data
US 2011/0106631 A1 May 5, 2011

Related U.S. Application Data

(60) Provisional application No. 61/257,284, filed on Nov. 2, 2009.

(51) Int. Cl.
*G06Q 30/00* (2012.01)
*G06Q 30/02* (2012.01)

(52) U.S. Cl.
CPC ......... *G06Q 30/0277* (2013.01); *G06Q 30/02* (2013.01); *G06Q 30/0241* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 7,200,576 B2 | 4/2007 | Steeves | |
| 8,132,255 B2 | 3/2012 | Mates | |
| 8,245,277 B2 | 8/2012 | Lazar | |
| 2007/0179846 A1 | 8/2007 | Jain et al. | |
| 2008/0082402 A1 | 4/2008 | Turrentine | |
| 2008/0133321 A1 | 6/2008 | Pennock et al. | |
| 2008/0133347 A1 | 6/2008 | Josifovski et al. | |
| 2008/0133348 A1 | 6/2008 | Reed et al. | |
| 2008/0147456 A1 | 6/2008 | Broder et al. | |
| 2009/0012855 A1* | 1/2009 | Jamal et al. | 705/14 |
| 2009/0106087 A1 | 4/2009 | Konar | |
| 2009/0113294 A1 | 4/2009 | Sanghavi | |

(Continued)

OTHER PUBLICATIONS

Office Action mailed Jun. 7, 2012 in U.S. Appl. No. 13/411,067, 10 pages.

(Continued)

*Primary Examiner* — Daniel Sorkowitz
(74) *Attorney, Agent, or Firm* — Davis Wright Tremaine LLP; Philip H. Albert (57) ABSTRACT

Embodiments of the present invention relate to a system and method for creating an interactive advertisement. The interactive advertisement is configured to convey a brand message to a user while at the same time provide website security by reducing unauthorized website access by Internet bots. According to certain embodiments of the present invention, users are required to adequately respond to the interactive advertisement in order to access certain website content. The user responses to the interactive advertisements are collected and utilized to generate marketing reports which illustrate the effectiveness of an interactive advertisement in conveying an advertiser's message.

15 Claims, 5 Drawing Sheets

(56) References Cited

U.S. PATENT DOCUMENTS

| | | |
|---|---|---|
| 2009/0319270 A1 | 12/2009 | Gross |
| 2009/0328150 A1 | 12/2009 | Gross |
| 2010/0095350 A1* | 4/2010 | Lazar et al. .................... 726/3 |
| 2010/0306043 A1 | 12/2010 | Lindsay et al. |
| 2011/0238466 A1 | 9/2011 | Haumont et al. |
| 2011/0276410 A1 | 11/2011 | Hjelm et al. |
| 2012/0130802 A1 | 5/2012 | Shimizu |

OTHER PUBLICATIONS

International Search Report for PCT/US10/55098 (Jan. 4, 2011).
Final Office Action in U.S. Appl. No. 13/411,067 dated Mar. 6, 2013, 17 pages.

* cited by examiner

| 500 | | | | | |
|---|---|---|---|---|---|
| How many calories are in Diet Drink ABC? | | | | | |
|  | Exposed | Not Exposed | % Exposed | % Not Exposed | Lift |
| 0 | 211 | 142 | 46.89 | 28.34 | 18.5 |
| 10 | 101 | 138 | 22.44 | 27.54 | -5.1 |
| 25 | 94 | 106 | 20.89 | 21.16 | -0.3 |
| 100 | 44 | 115 | 9.78 | 22.95 | -13.2 |
| Totals | 450 | 501 | | | |

SYSTEM AND METHOD FOR GENERATING AND MANAGING INTERACTIVE ADVERTISEMENTS

CROSS-REFERENCE TO RELATED APPLICATION

This application claims the benefit of U.S. Provisional Patent Application No. 61/257,284, filed Nov. 2, 2009 titled, "Brand Marketing Attention System and Micropayment Platform," which is herein incorporated by reference.

FIELD OF THE INVENTION

The present invention relates generally to a method and system for generating and managing interactive advertisements. More specifically, embodiments of the present invention relate to a method and system for generating interactive advertisements for display on a website or other electronic medium, wherein the interactive advertisement is configured to elicit and receive a user response related to the advertisement.

BACKGROUND OF THE INVENTION

Internet users have become increasingly desensitized to online advertising. These users often fast forward through video ads, ignore online banner ads and speed past interstitial pages. Years of exposure to various forms of online advertisements have left users adept at blocking out unwanted information while accesses information online or through other electronic media outlets.

Even as users decrease the attention given to online advertisements, many marketers are increasing their online advertisement budgets, collectively spending billions of dollars in an effort to capture the attention of online users. The increase in online advertising budgets reflects consumers' shift away from traditional media outlets, such as television, newspapers, and magazines, to the Internet and other electronic mediums.

With the significant rise of Internet usage over the last decade, online Publishers, e-commerce websites or their website hosts, collectively referred to as publishers, have become increasing concerned with online security, in particular unauthorized website access by Internet robots (i.e., non-human entities), or simply "bots." A bot is a software application configured to run automated tasks over the Internet. A bot may be configured to artificially increase the traffic generated by a given website or perform other unwanted actions on a website.

To combat the problem of unauthorized website access by bots, publishers implement simple challenge and response tests, otherwise known as a Captcha, to confirm a request for access originates from a human user instead of a bot. To access additional content on a website implementing a Captcha, the user is required to view an image containing a portion of text and input the portion of text into a provided textbox. The portion of text within the Captcha is often blurred, skewed, or altered in some fashion to prohibit a bot from correctly identifying the text using standard optical scanning techniques. The text included in a Captcha is randomly selected and conveys no useful information to the user and provides no revenue to the publishers.

The process of completing a Captcha requires the user to commit a few seconds of attention on a specific image and respond to the image by physically entering text into a textbox. Unlike banner ads or online video ads where users are not forced to engage with the content, Captchas required a certain level of attention from a user to correctly identify and input the displayed text satisfactorily to overcome the challenge and enter the desired site. As a result, users may spend more time focused on the text within a Captcha than reading a paid-for banner ad displayed on the same webpage. Currently, from the perspective of an online advertiser, the time users spend focused on each Captcha represent a lost opportunity to reach potential customers.

As a result, there is a need in the art for a method and system to integrate an advertisement into a Captcha to create an interactive advertisement.

SUMMARY OF THE INVENTION

Embodiments of the present invention satisfy these needs and others by providing a method and system for generating interactive advertisements. As used herein, the term "interactive advertisement" includes, but is not limited to, an electronic media configured to convey a branded message from an advertiser to a user configured to allow the user to engage or interact with the electronic media. The interactive advertisement may include at least a media segment and a user input segment. The media segment comprises an advertisement for presenting to a user, including but not limited to, a puzzle, a game, text or any other media. The user input segment may be any suitable interface configured to allow the user to engage with the interactive advertisement and receive a user response provided by the user in relation to the media segment, such as, for example, a textbox, a drop down menu, a radio button, etc.

In addition to conveying a brand message, an interactive advertisement may act as a Captcha and provide security for the website on which the interactive advertisement is displayed. In doing so, the interactive advertisement may require a user to provide a specific user response in order to receive access to content from the given website. For example, a website may display an interactive advertisement containing a branded message presenting a user with the following brand message, "Our Diet Soft Drink Has Zero Calories," and then request the user to provide a user response stating the number of calories contained in the advertised soft drink. In such an embodiment of the present invention, the user will be prevented from receiving access to content from the website unless the user enters "zero" as his or her response, thereby correctly interacting with the interactive advertisement and associated challenge. Alternatively, the user may be required to provide the entire phrase "Our Diet Soft Drink Has Zero Calories" as a user response to overcome the access challenge associated with the interactive advertisement.

A publisher of a website may seek to implement web security by confirming that a request for a webpage originates from a human user, and not a bot, while at the same time generating advertising revenue. To achieve both web security and revenue generation, the publisher may incorporate an interactive advertisement into a webpage of the website, wherein a user must adequately response to a challenge associated with the interactive advertisement to receive addition webpages from the publisher. According to an embodiment of the present invention, the publisher requests the generation of an interactive advertisement to be displayed on the publisher's website. Depending on the level of security and advertising revenue desired by the publisher, the subject matter of the website, and/or other publisher attributes, an advertiser is selected from a pool of advertisers and a interactive advertisement is generated based on a plurality of advertising parameters corresponding to the selected advertiser.

Embodiments of the present invention allow an advertiser to define a plurality of advertising parameters that may be used to generate an interactive advertisement. The plurality of advertising parameters define the appearance and, in certain respects, the functionality of the interactive advertisement. The interactive advertisement is generated and displayed to the user. If the user provides a correct user response (i.e., satisfactorily responding to the challenge presented by the interactive advertisement) in reply to the interactive advertisement, the publisher may assume the user is not a bot and therefore serve additional content to the user. If an incorrect user response is received, the publisher may restrict access to the given user or provide an alternative interactive advertisement to allow the user an additional opportunity to solve the challenge associated with the interactive advertisement. The user responses may be collated and stored for later use in generating analytics reports (e.g., marketing or advertising reports).

In alternative embodiments of the present invention, an interactive advertisement may be configured to capture a user response, but does not require the user to satisfactorily solve the challenge associated with the interactive advertisement in order to receive additional content from the publisher. Marketing reports created based on user responses may be used to analyze the effectiveness of a given advertising campaign or slogan, user retention of product messages, and/or brand preferences.

An embodiment of the present invention provides for confirming a request from access to a web element is initiated by a human by, identifying an advertiser based on a user dataset, retrieving a plurality of advertising parameters corresponding to the identified advertiser, generating based on the plurality of advertising parameters the interactive advertisement comprising a media segment and a user input segment configured to receive the user response, transmitting the interactive advertisement to the user, receiving the user response, and verifying the user response based on a portion of the plurality of advertising parameters.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE DRAWINGS

Embodiments of the present invention relate to a system and method for creating an interactive advertisement. An interactive advertisement is configured to include a media segment and a user input segment. The media segment represents a portion of the interactive advertisement comprising the advertising content and may include any one or more of text, ad copy, puzzle, or other branded message to be displayed or otherwise presented to the user. The user input segment represents a portion of the interactive advertisement where the user may enter text, select an option, or otherwise interact or engage with the interactive advertisement. Requiring a user to read or listen to the media segment and respond via the user input segment, increases the focus a user gives to the advertising content brand message included in the interactive advertisement, as compared to a conventional online advertisement. As a result the interactive advertisement provides greater value and a stronger impression to an advertiser. In addition, verifying if a user adequately response to the challenge associated with an interactive advertisement provides web security by identifying a user as human, as compared to a bot.

Figure 1:
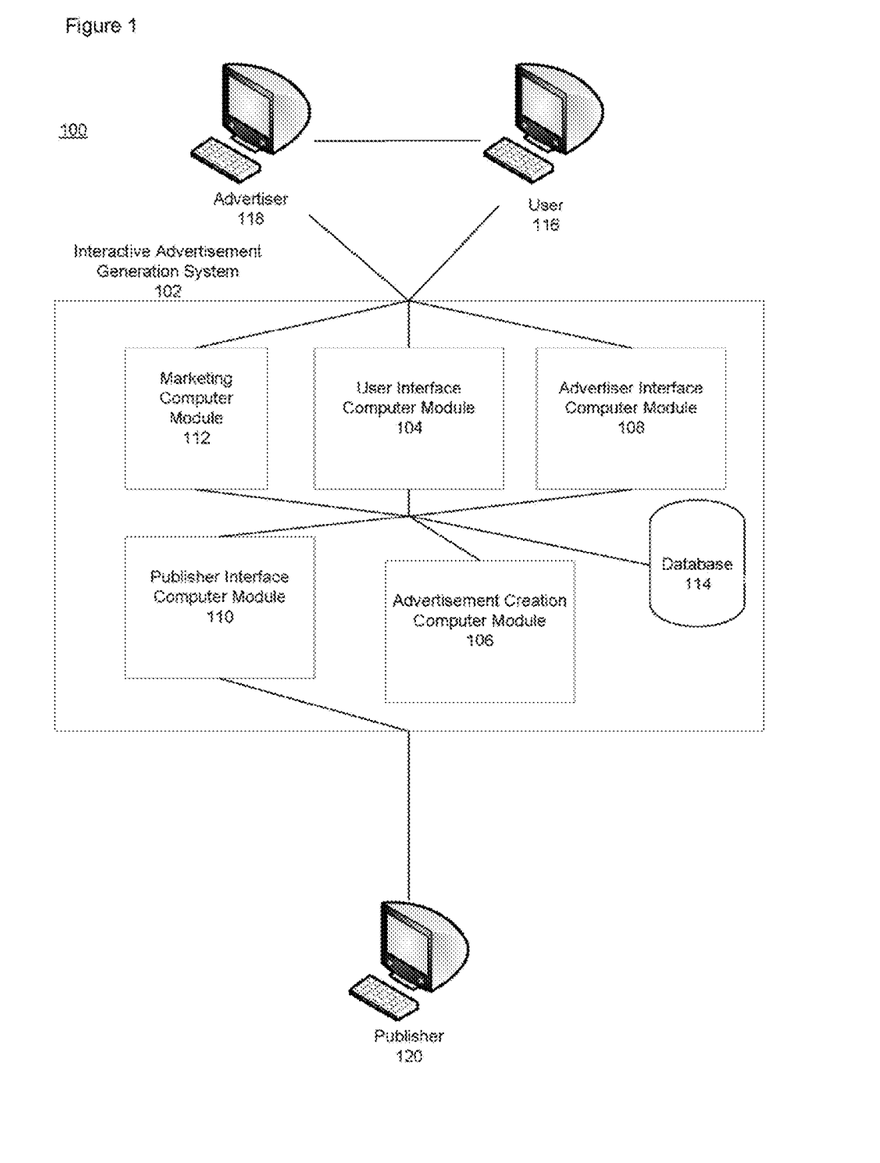
FIG. 1 illustrates an exemplary system for generating an interactive advertisement, according to an embodiment of the present invention.

FIG. 1 illustrates an exemplary Data Network 100 including an exemplary environment comprising an Interactive Advertisement Generation System 102 according to an embodiment of the present invention. According to the present invention, the Interactive Advertisement Generation System 102 comprises a User Interface Computer Module 104, an Advertisement Creation Computer Module 106, an Advertiser Interface Computer Module 108, a Publisher Interface Computer Module 110, a Marketing Computer Module 112, a Database 114 communicatively connected to a User 116, an Advertiser 118 and a Publisher 120. As used herein, the term "computer module" is intended to include, but is not limited to, any data processing device, such as a desktop computer, a laptop computer, a mainframe computer, a personal digital assistant, a server, a handheld device, or any other device able to process data configured to execute one or more software programs configured to perform one or more functions. The aforementioned components of the Data Network 100 and the Interactive Advertisement Generation System 102 represent computer hardware and computer-implemented software configured to perform the functions described in detail below. One having ordinary skill in the art will appreciate that the components of the Interactive Advertisement Generation System 102 may be implemented on one computer or a multiple computers communicatively connected computers. The term "communicatively connected" is intended to include, but is not limited to, any type of connection, whether wired or wireless, in which data may be communicated, including, for example, a connection between devices and/or programs within a single computer or between devices and/or programs on separate computers. The exemplary Data Network 100 shown in FIG. 1 illustrates includes only one user, publisher, and advertiser, however multiple users, publishers, and advertisers may interact via the Interactive Advertisement Generation System 102.

The features and functionality according to embodiments of the Interactive Advertisement Generation System 102 and its components are described in detail in connection with the system diagram of FIG. 1 and the process flow diagram of FIG. 2. As illustrated in FIG. 1, one or more user computers (e.g., User 116) are communicatively connected to the Publisher 120 and the Interactive Advertisement Generation System 102. As user herein, the one or more websites (e.g., Publisher 120) may include any website or electronic resource provider configured to provide content to the User 116. For example, the Publisher 120 may be an online newspaper configured to transmit electronic news articles to the User 116. Alternatively, the Publisher 120 may be an e-commerce website selling concert tickets, books, digital content, or any other product or service.

According to an embodiment of the present invention wherein the Publisher 120 is an online newspaper, the User 116 may access the Publisher 120 to download a specific news article. To provide security from unauthorized access, the Publisher 120 may require the User 116 to successfully interact with a challenge provided via or in the form of an interactive advertisement prior to accessing the specific news article. In response to a request for content, the Publisher 120 transmits to the User 116 a webpage wherein the webpage configured to direct the web browser of the User 116 to download an interactive advertisement from the Interactive Advertisement Generation System 102.

Figure 2:
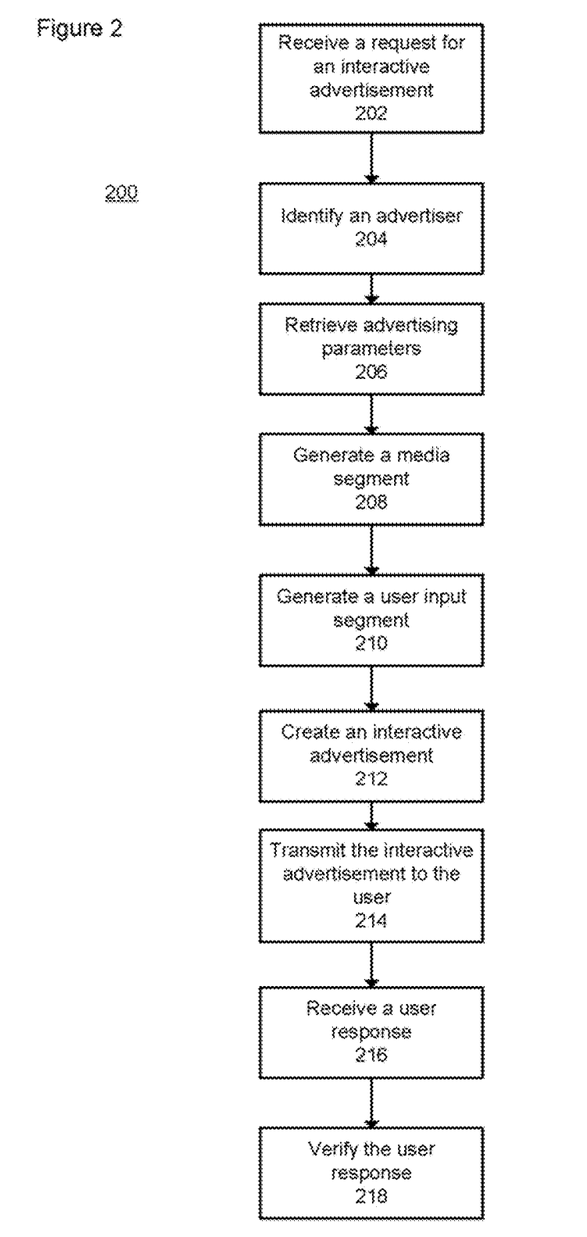
FIG. 2 illustrates an exemplary method for generating and implementing an interactive advertisement, according to an embodiment of the present invention.

According to the embodiment of the present invention, as illustrated in FIG. 2, method 200 begins at step 202 by receiving a request for an interactive advertisement from the User 116. The Interactive Advertisement Generation System 102, specifically the User Interface Computer Module 104, is communicatively connected to the User 116 and is configured to receive a request for an interactive advertisement. The request may come from the browser of the User 116, triggered by a webpage provided to the User 116 by the Publisher 120. The Publisher 120 may transmit a webpage to the User 116 wherein the webpage may include Java Script or other like computer code configured to retrieve and display to the User 116 an interactive advertisement. According to an embodiment of the present invention, the interactive advertisement acts as a security measure by requiring the User 116 to adequately answer a question or a solve puzzle presented by the interactive advertisement prior to providing access to additional content from the Publisher 120.

According to an embodiment of the present invention, the request for an interactive advertisement comprises a user dataset. The term "user dataset" is intended to include, but is not limited to, one or more data points implicitly or explicitly provided by a user or software running on the user's computer which may identify the webpage that triggered the request for the interactive advertisement, the user's web browsing history, demographic information, computer configuration, location, or any other information which may be relied on when generating an interactive advertisement. Portions of the user dataset may be based on cookies, computer configuration files, or other information stored on the computer of the User 116.

Following receipt of the request for an interactive advertisement at step 202, method 200 continues at step 204 by identifying an advertiser. According to the embodiment of the present invention illustrated in FIG. 1, the Advertiser Interface Computer Module 108 is configured to select an advertiser that will determine the content of the interactive advertisement. The Advertiser Interface Computer Module 108 may consider one or more portions of the user dataset to identify an appropriate advertiser. For example, the Advertiser Interface Computer Module 108 may analyze a user dataset to determine that the User 116 is located in the New York metropolitan area and regularly visits sports related websites. As a result, the Advertiser Interface Computer Module 108 may search the Database 114 for advertisers to identify an advertiser interested in reaching sports fans within the New York metropolitan area. When an advertiser (e.g., Advertiser 118) establishes an advertising campaign with the Interactive Advertiser Generation System 102, the Advertiser 118 can specify the target market or markets they wish to reach. In addition, the Advertiser 118 may identify the field in which their advertisements are directed, such as, consumer electronics, travel, healthcare, etc. The Advertiser Interface Computer Module 108 is configured to match a user with an advertiser based in part on the user dataset and the preference(s) defined by the advertiser.

In addition, the Publisher 120 may communicate with the Publisher Interface Computer Module 110 to specify the type of advertisers the Publisher 120 would like to include on their website. For example, the Publisher 120 may be an online newspaper with a focus on leisure activities. As a result, the Publisher 120 may specify that interactive advertisements from advertisers within the fields of Arts and Entertainment, Travel, and Sports are acceptable content to be displayed on the website of the Publisher 120.

Using the Publisher Interface Computer Module 110, the Publisher 120 may create a profile identifying preferences regarding the advertisers and/or advertisement fields eligible for inclusion on the Publisher's 120 website or portions of a website. In an embodiment of the present invention wherein the Publisher 120 is an online newspaper covering a wide array of topics, the Publisher 120 may identify an advertisement field as acceptable for the sports section but unacceptable for the fashion section. As a result, the Publisher 120 can customize preferences to ensure the subject matter of an interactive advertisement displayed in conjunction with their website is appropriate for the forum and intended audience.

Furthermore, the Publisher 120 may specify the security rating corresponding to the interactive advertisements displayed on the Publisher's 120 website. As described above, an interactive advertisement may provide security for the Publisher's 120 website by requiring the User 116 viewing the interactive advertisement to satisfactorily responding to the challenge presented by the interactive advertisement prior to accessing certain content on the Publisher's 120 website. The more difficult an interactive advertisement for a bot to supply a satisfactory response the more security the interactive advertisement provides, and accordingly a higher security rating is assigned to the interactive advertisement. To create a more secure interactive advertisement, the visual complexity of the interactive advertisement is increased by altering the text and/or background of the interactive advertisement or including image noise into the background of the interactive advertisement. Increasing the visual complexity of an interactive advertisement reduces the ability of a bot to correctly decipher the text included in the interactive advertisement and therefore reduces the ability for a bot to adequately respond to the interactive advertisement. However, increasing the visual complexity of an interactive advertisement also reduces the readability of the branded message by human users and therefore decreases the value of the interactive advertisement to an advertiser. As a result, when selecting the desired security rating for interactive advertisements displayed on a given website, a Publisher 120 must balance the desired level of security provided by an interactive advertisement with a desired level of clarity in the presentation of the interactive advertisement. In the event an interactive advertisement for a given advertiser can not be created to meet the security/revenue balance specified by the Publisher 120, an alternative advertiser will be selected.

Following the use of the Advertisement Interface Computer Module 108 and the Publisher Interface Computer Module 110 to identify an advertiser, method 200 continues by retrieving advertising parameters, at step 206. As used herein, the term "advertising parameter" is intended to include, but is not limited to, one or more options characteristics, definitions, rules, and/or other information defined by an advertiser for use in the creation of an interactive advertisement relating to the advertiser. The advertising parameters specify the appearance and functionality of an interactive advertisement as well as the cost the Advertiser 118 is willing to pay to Publisher 120 for displaying the interactive advertisement. According to certain embodiments of the present invention, the Advertiser 118 connects to the Advertiser Interface Computer Module 108 through a web interface to configure the advertising parameters. The Advertiser 118 may utilize the Advertiser Interface Computer Module 108 to view, update and edit the advertising parameters via any conventional graphical user interface, and the advertiser-set advertising parameters are stored by the Interactive Advertisement Generation System 102.

Figure 3:
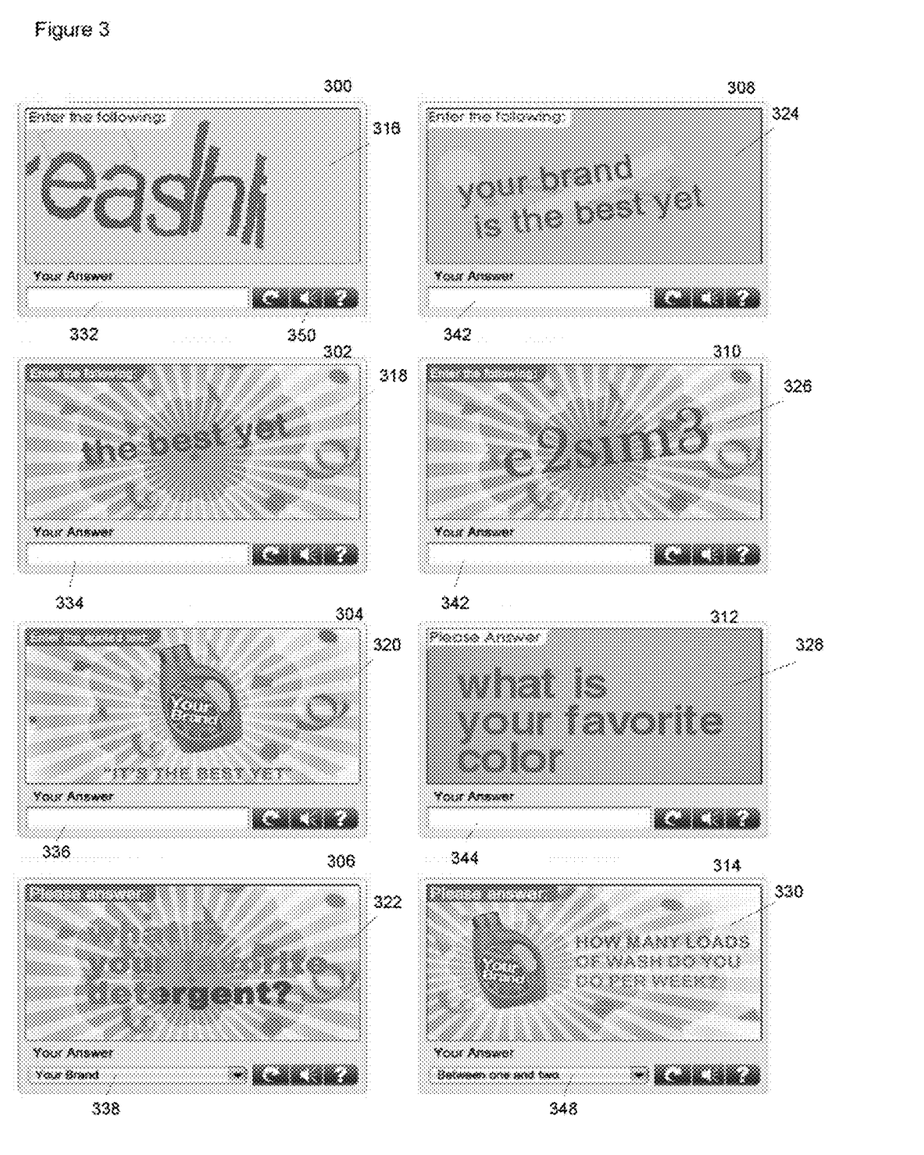
FIG. 3 illustrates examples of interactive advertisements, according to an embodiment of the present invention.

According to certain embodiments of the present invention, there are two types of interactive advertisement: a type-in interactive advertisement and an impression interactive advertisement. A type-in interactive advertisement provides a user with a text box to allow the user to interact with the interactive advertisement by typing text into the text box. As illustrated in FIG. 3, interactive advertisements 300, 302, 304, 308 and 310 are examples of type-in interactive advertisements, according to an embodiment of the present invention. An impression interactive advertisement provides a user with a drop down menu, or other suitable selection mechanism, configured to allow the user to interact with the interactive advertisement by selecting an option from the drop down menu or other like interface. As illustrated in FIG. 3, interactive advertisements 306 and 314 are all impression interactive advertisements. The Advertiser 118 may utilize a type-in interactive advertisement, impression interactive advertisement or a hybrid of the two depending on the goal of a given advertising campaign. The Advertiser 118 may utilize the one or more advertising parameters of a given advertiser to create the interactive advertisement and select the appropriate advertisement type.

According to certain embodiments of the present invention, the User 116 is required to view the interactive advertisement and reply to the interactive advertisement by entering a specific string or combination of text, or substantially similar string or combination of text, into a textbox or selecting a specific option from a drop down menu in order to gain access to certain content of the Publisher 120. Using the advertisement parameters, the Advertiser 118 defines the answer that must be provided by the User 116 to solve the interactive advertisement.

Furthermore, the Advertiser 118 may use the advertising parameters to identify a background image or text to be included in an interactive advertisement. For example, referring to FIG. 3, the advertiser associated with the example Interactive Advertisement 302 provided the stylized background and text "the best yet" to be used when creating the Interactive Advertisement 302. The Advertiser 118 may upload an image file to be used as the background. In comparison, the advertiser responsible for the Interactive Advertisement 308 only provided the text "your brand is the best yet" and allowed the background to be randomly generated. According to certain embodiments of the present invention, the Advertiser 118 may create customized media content which includes both the background and the text as a single image, as illustrated in interactive advertisement 314.

According to certain embodiments of the present invention, the advertising parameters may allow for further customization of an interactive advertisement. For example, the advertisement parameters define the text size, text font, language, and/or provide a tracking pixel to be included in an interactive advertisement.

Following the retrieval of the advertising parameters from the Database 114, method 200 continues by generating a media segment, at step 208. Each interactive advertisement comprises a media segment and a user input segment. The media segment represents the portion of the interactive advertisement wherein the Advertiser 118 displays a message to the User 116. The user input segment represents the portion of the interactive advertisement configured to receive a user response from the User 116. For example, as illustrated in FIG. 3, item 318 represents a media segment and item 334 represents a user input segment of the Interactive Advertisement 302.

According to certain embodiments of the present invention, the Advertisement Creation Computer Module 106 is configured to create the media segment. To create the media segment, the Advertisement Creation Computer Module 106 consults the retrieved advertising parameters to identify the text and background specified by the Advertiser 118. The Advertisement Creation Computer Module 106 creates an image by combining the identified text and background. If additional advertising parameters (e.g., text color, font, etc.) are provided, the Advertisement Creation Computer Module 106 alters the text accordingly. In the event that text, background, or both are not provided, the Advertisement Creation Computer Module 106 will supplement the deficiency by utilizing random text or background or by selecting appropriate text or background based on the advertiser. According to certain embodiments of the present invention wherein the Advertiser 118 provides customized media content, the Advertisement Creation Computer Module 106 may utilize the customized media content as the media segment without adding additional text or background. Further embodiments of the present invention may allow the Advertiser 118 to specify the use of multiple images within a single media segment. In such an embodiment, the interactive media element cycles through the series of images when the interactive advertisement is displayed to the User 116.

To increase the security rating of an interactive advertisement, the visual complexity of the media segment may be altered to reduce the likelihood that a bot will be able to overcome security challenges associated the interactive advertisement. Such alterations may include blurring, skewing, or rotating the text included in the media segment, or altering the background. As described above, the Publisher 120 defines a desired security rating for an interactive advertisement displayed on the website of the Publisher 120, and in the event the media segment can not be visually altered to achieve the desired security rating, an alternative advertiser may be selected for the Publisher 120.

Following the generation of the media segment, method 200 continues by generating a user input segment, at step 210. As described above, the user input segment is configured to receive a user response. According to certain embodiments of the present invention, the Advertisement. Creation Computer Module 106 is configured to generate the user input segment. As described above, an interactive advertisement may be a type-in interactive advertisement or an impression interactive advertisement, as specified by the advertising parameters. In an embodiment of the present invention wherein the advertising parameters specify a type-in interactive advertisement, the Advertisement Creation Computer Module 106 generates a user input segment comprising a text box configured to receive a user response.

Alternatively, when generating an impression interactive advertisement, the Advertisement Creation Computer Module 106 creates a drop down menu comprising a plurality of options, wherein the advertising parameters define the options to be included. For example, according to the Interactive Advertisement 314, the advertising parameters may define the "Between one and two," "Between two and five," and "Over five" as possible answers to the question presented "How many loads of wash do you do per week?" As a result, the Advertisement Creation Computer Module 106 creates a user input segment comprising a drop down menu with the options of "Between one and two," "Between two and five," and "Over five." The user input segment may also provide icons 350 that allow the user to request a different interactive advertisement, receive an audio message prompting the user to provide a user response, or access help information.

According to certain embodiments of the present invention, the Advertisement Creation Computer Module 106 is configured to generate the interactive advertisement, at step 212. The interactive advertisement is generated by combining the media segment and the user input segment into a single file. The generated interactive advertisement is assigned an identification number, or challenge ID. The challenge 1D allows a user response to be linked to or associated with a given interactive advertisement, described in greater detail below.

According to an alternative embodiment of the present invention, a banner advertisement may be included in the interactive advertisement, in addition to the media segment. Given that the User's 116 focus will be directed to the media segment, locating a banner advertisement in close proximity to the media segment may capture a portion of the User's 116 attention, thereby providing addition value to an advertiser. The banner advertisement and the media segment may not necessary relate to the same product or advertiser.

Following the creation of the interactive advertisement, the User Interface Computer Module 104 transmits the interactive advertisement to the User 116. According to certain embodiments of the present invention, the User Interface Computer Module 104 may first transmit an initial data package comprising cookie information, display configuration information, and other data to the User 116 prior to transmitting the interactive advertisement. After the transmission of the initial data package, the User Interface Computer Module 104 transmits the interactive advertisement to the User 116. According the certain embodiments of the present invention, the interactive advertisement may be transmitted to the Users 116 together with the initial data package. The interactive advertisement may be rendered on the User's 114 display through use of a web browser or other software application. Once displayed, the User 116 will view the interactive advertisement and reply by providing a user response as prompted by the media segment. For example, in an embodiment of the present invention wherein the Interactive Advertisement 304 is transmitted, the User 116 should type the text "the best yet" into the text box. The phrase "the best yet" will represent the user response.

According to certain embodiments of the present invention, the user response is initially transmitted from the User 116 to the Publisher 120, given that the interactive advertisement is embedded within a webpage of the Publisher 120. In addition to the user response, the User 116 also provides the Publisher 126 with the challenge ID. The Publisher 120 forwards the user response and the challenge ID to the Interactive Advertisement Generation System 102, and the Publisher Interface Computer Module 110 receives the user response and challenge ID at step 216.

Following the receipt of the user response and challenge ID, method 200 concludes at step 218 wherein the user response is verified. Verification of the user response will vary depending on the interactive advertisement. According to an embodiment of the present invention wherein the advertisement parameters define a correct answer or an adequate response for a given interactive advertisement, verification comprises retrieving the correct or expected answer and determining if the user response matches, or substantially matches, the correct answer or adequate response. The challenge ID is used to identify the correct interactive advertisement and thereby retrieve the corresponding correct answer. The user response is then compared to the correct answer. If the user response matches the correct answer, the Interactive Advertisement Generation System 102 determines that the user has adequately responded to the interactive advertisement and the user response is deemed acceptable. Alternatively, if the user response does not match the correct answer, the user response is deemed unacceptable. The verification result of acceptable or unacceptable is returned to the Publisher 120, wherein the Publisher 120 may determine the appropriate action to take based on the verification result.

In addition to verifying the accuracy of the user response, the Marketing Computer Module 112 may collect the user response for use in generating marketing reports, as discussed in greater detail below. In addition, the frequency with which the user satisfactorily responds to the challenge presented by the interactive advertisement may also be collected to determine the difficulty of a given interactive advertisement and the strength of the impression.

In an alternative embodiment of the present invention wherein the interactive advertisement does not specify a correct answer, the User 118 is not required to satisfactorily respond to the interactive advertisement. In such an embodiment, verification may include collection of the user response by the Marketing Computer Module 112 for use as marketing and brand recognition data. In such an embodiment, the Marketing Computer Module 112 may collect the user response information and provide to the Publisher 126 a verification result identifying the user response as acceptable, despite not comparing the user response against a correct answer.

As described above, the Marketing Computer Module 112 is configured to collect the responses provided by the plurality of users that reply to the interactive advertisements generated by the Interactive Advertisement Generation System 102. The Marketing Computer Module 112 may store the user responses in Database 114 for later analysis in connection with the generation of marketing reports.

Figure 4:
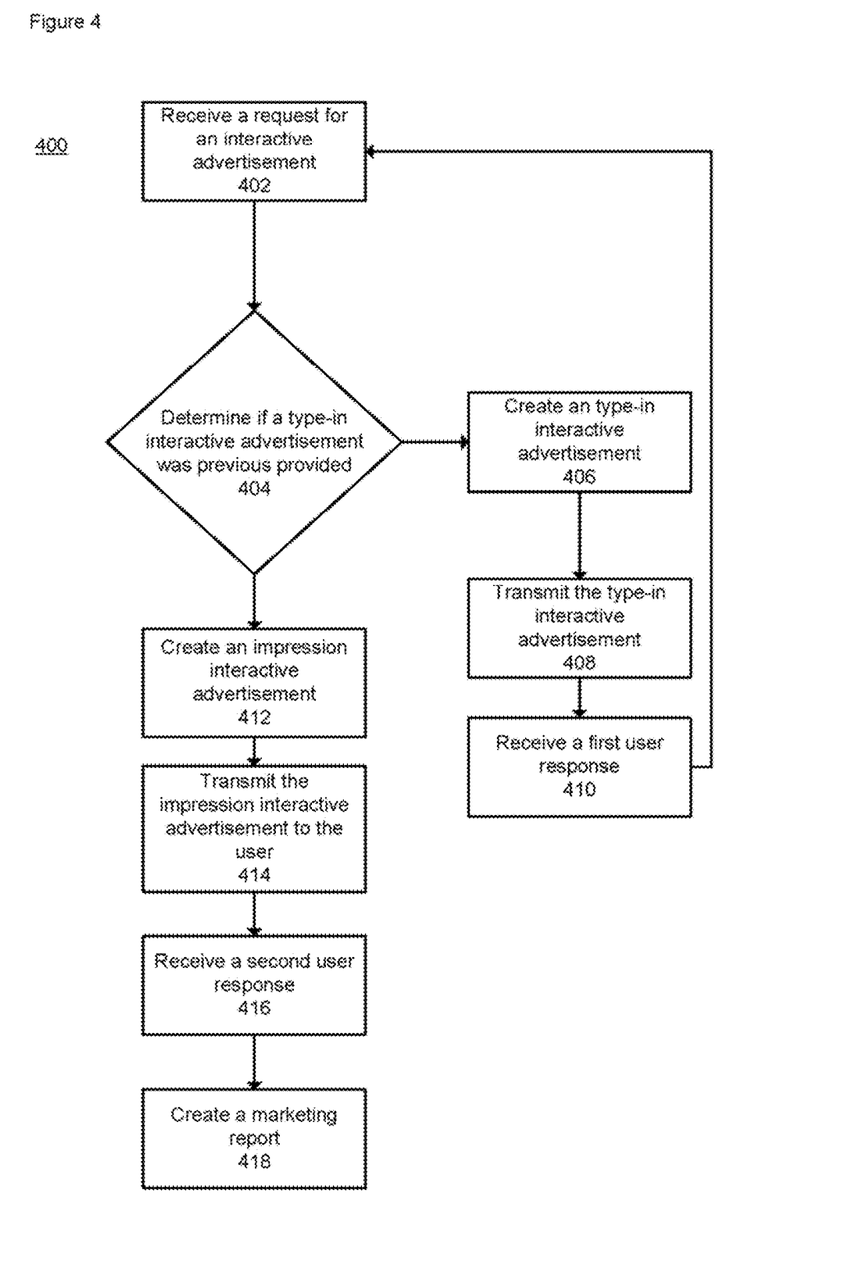
FIG. 4 illustrates an exemplary method for generating a marketing report, according to an embodiment of the present invention.

According to an embodiment of the present invention, FIG. 4 illustrates a method 400 for generating a marketing report based on a plurality of user responses. The marketing report created by method 400 is intended to analyze the effectiveness of a type-in interactive advertisement. In order to create a marketing report according to method 400, the Advertiser Interface Computer Module 108 is configured to allow the Advertiser 118 to request the creation of a series of corresponding interactive advertisements, more specifically, for the creation of a type-in interactive advertisement and a related impression interactive advertisement where the questions presented are related. For example, if the Advertiser 118 is marketing diet soft drinks, the User 116 may first be presented with a type-in interactive advertisement stating "Diet Drink. ABC Has Zero Calories" and the Interactive Advertisement Generation System 102 may require the User 116 to type in a user response of "zero" or "0." This initial type-in interactive advertisement educates the User 116 about a given product. At a later time, when the User 116 requests a subsequent interactive advertisement, the Advertisement Creation Computer Module 106 may determine that the User 116 had previously been displayed the type-in advertisement related to the diet soft drink and as a result, display a corresponding impression interactive advertisement stating "How Many Calories Does Diet Drink ABC Have?" while providing the User 116 with a drop down menu populated with the options "0," "10," "25" and "100." The User 118 was previously exposed to the correct answer of "0" while completing the type-in interactive advertisement and therefore should respond adequately to the impression advertisement at a higher rate than users who were not previously exposed to the corresponding type-in interactive advertisement. Asking related questions provides brand reinforcement as well as generates data to gauge the effectiveness of the original type-in interactive advertisement.

According to the embodiment of the present invention described in FIG. 4, method 400 begins at step 402 by receiving a request for an interactive advertisement. An advertiser is selected in a similar fashion as described above in step 204 of FIG. 2. However, according to method 400, the Advertiser 118 elects to provide the User 116 with a series of related interactive advertisements, including, a type-in interactive advertisement and an impression interactive advertisement.

After receiving the request for an interactive advertisement and selecting an advertiser with an advertising campaign that includes a series of related interactive advertisements, method 400 continues by determining at step 404 if the User 116 has previously been provided the type-in interactive advertisement, which represents the first interactive advertisement in the series.

If the User 116 has not yet viewed the type-in interactive advertisement, method 400 continues by creating the type-in interactive advertisement, at step 406, and transmitting the same to the user at step 408. The User 116 views the type-in interactive advertisement, and, method 400 continues at step 410 by receiving the User's 116 user response in reply to the type-in interactive advertisement. The user response is stored in the Database 114 for later use when generating the marketing report.

According to the embodiment of the present invention in FIG. 4, method 400 continues at step 402 by receiving a request from the User 116 for a subsequent interactive advertisement. The User 116 is identified, at step 404, as having previously viewed the type-in interactive advertisement, and therefore method 400 continues to step 412, wherein the related impression interactive advertisement is generated. As described above, the related impression interactive advertisement may present to the User 116 a question similar to that which was displayed in the type-in interactive advertisement. The impression interactive advertisement is transmitted to the User 116 at step 414 and the related user response is received at step 416. The user response is stored to the Database 114 for later use when creating a marketing report. The series of related interactive advertisements are displayed to a plurality of users with all of the corresponding user responses stored in the Database 114.

In addition to exposing users to the type-in interactive advertisement followed by the related impression interactive advertisement, some users are simply exposed to the impression interactive advertisement without first being "educated" by the type-in interactive advertisement. Collecting data regarding users who are only exposed to the impression interactive advertisement allows for the effectiveness of the type-in interactive advertisement to be more accurately measured.

Figure 5:
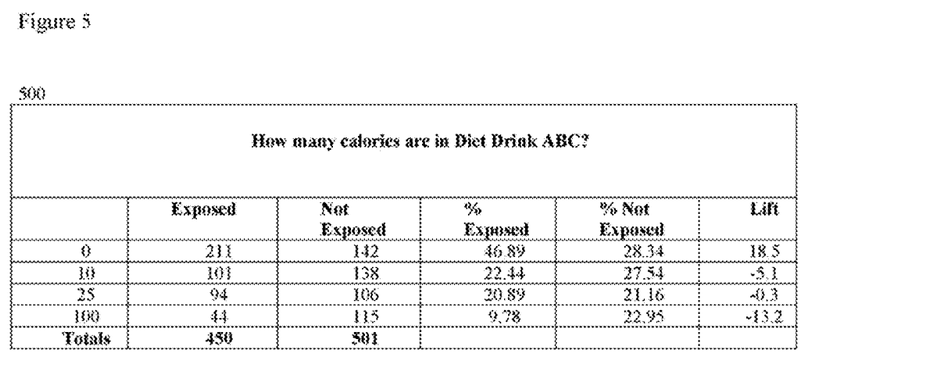
FIG. 5 illustrates an exemplary marketing report generating according to an embodiment of the present invention.

According to the embodiment of the present invention described in FIG. 4, method 400 concludes at step 418 by generating a marketing report based on the user responses to the related interactive advertisements. In FIG. 5, an exemplary Marketing Report 500 is shown which correlates the user responses. The Marketing Report 500 displays the data corresponding to the user responses to the impression interactive advertisement. The Marketing Report 500 separates the users into two user categories; "exposed" and "not exposed." Exposed users represent user who where previously exposed to the type-in interactive advertisement before viewing the impression interactive advertisement and the not exposed users are users who were not exposed to the type-in interactive advertisement before viewing the impression interactive advertisement. The Marketing Report 500 allows the Advertiser 118 to track and measure the effect a type-in interactive advertisement may have on educating a user. The Marketing Report 500 identifies the number and percentage of exposed users that satisfactorily respond to the impression interactive advertisement as compared to the not-exposed users. Furthermore, the Marketing Report 500 quantifies the lift, or increase in users that satisfactorily respond to the impression interactive advertisement, provided by exposing a user to the type-in interactive advertisement before the impression interactive advertisement. The Marketing Report 500 may be generated and stored in the Database 114 wherein the Advertiser 118 may electronically view the Marketing Report 500. Alternatively, the Marketing Report 500 may be electronically transmitted to the Advertiser 118.

According to alternative embodiments of the present invention, marketing reports of greater complexity may be generated. For example, the effectiveness of a series a three or more interactive advertisements may be analyzed. Alternatively, two different type-in interactive advertisements may be related to the single impression interactive advertisement to test the effectiveness of each type-in interactive advertisement. Furthermore, any addition marketing report may be generated based on the information collected by the Interactive Advertisement Generation System 102.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method for verifying a user response corresponding to an interactive advertisement, comprising:

identifying, by a computer, an advertiser based on a user dataset;

retrieving, by the computer, a plurality of advertising parameters corresponding to the identified advertiser;

generating based cm the plurality of advertising parameters, by the computer, the interactive advertisement comprising:

(a) a media segment, and (b) a user input segment configured to receive the user response;

transmitting, by the computer, the interactive advertisement to a user;

receiving, by the computer, the user response;

verifying, by the computer, the user response based on a portion of the plurality of advertising parameters to form a verification result;

determining a publisher response based on the verification result, wherein the publication response includes providing access to content if the verification result sent to a publisher indicates that access should be given, wherein verifying the user response includes at least one state wherein the publisher is sent the verification result indicating a verification when the user response was not a correct user response, thereby allowing the user to receive content from the publisher even when the user did not satisfactorily solve a challenge.

2. The computer implemented method of claim 1, wherein verifying the user response comprises determining that the user response was provided by a human.

3. The computer implemented method of claim 1, wherein the user input segment is configured to receive the user response as text entered by the user.

4. The computer implemented method of claim 1, wherein the user input segment comprises a drop down menu configured to allow the user response to be selected from the drop down menu.

5. The computer implemented method of claim 1, wherein the user response is responsive to the media segment.

6. The computer implemented method of claim 1, wherein the interactive advertisement acts as a challenge configured to verify that the user is a human.

7. The computer implemented method of claim 1, wherein the plurality of advertising parameters comprise a correct answer and verifying the user response comprises confirming that the user response is similar to the correct answer.

8. A system for verifying a user response, implemented using at least a processor, comprising;
    an advertisement creation computer module configured to:
        (a) identify an advertiser based on a user dataset;
        (b) retrieve a plurality of advertising parameters corresponding to the identified advertiser;
        (c) generate based on the plurality of advertising parameters, an interactive advertisement, comprising:
            (1) a media segment; and
            (2) a user input segment configured to receive the user response; and
        (d) verify the user response based on a portion of the plurality of advertising parameters, wherein, for at least one state, a user response is deemed verified even if the user response was not a correct user response, thereby allowing the user to receive content from a publisher even when the user did not satisfactorily solve a challenge; and
    a user interface computer module communicatively connected to the advertisement creation computer module configured to:
        (a) transmit the interactive advertisement to the user; and
        (b) receive the user response.

9. The system of claim 8, the user interface computer module is configured to determine that the user response was provided by a human when verifying the user response.

10. The system of claim 8, wherein the user input segment is configured to receive the user response as text entered by the user.

11. The system of claim 8, wherein the user input segment comprises a drop down menu configured to allow the user response to be selected from the drop down menu.

12. The system of claim 8, wherein the user response is responsive to the media segment.

13. The system of claim 12, wherein the interactive advertisement acts as a challenge configured to verify that the user is a human.

14. The system of claim 8, wherein the plurality of advertising parameters comprises a correct answer and verifying the user response comprises confirming that the user response is similar to the correct answer.

15. The computer implemented method of claim 1, further comprising providing a user access to a web resource when the user response is verified based on the plurality of advertising parameters.

* * * * *

UNITED STATES PATENT AND TRADEMARK OFFICE
CERTIFICATE OF CORRECTION

PATENT NO. : 9,704,183 B2  
APPLICATION NO. : 12/917948  
DATED : July 11, 2017  
INVENTOR(S) : Todd Lieberman, Jeff Weisberg and Ari Jacoby Page 1 of 1

It is certified that error appears in the above-identified patent and that said Letters Patent is hereby corrected as shown below:

In the Claims

Column 12  
Line 60, "cm" should be -- on --

Signed and Sealed this  
Eleventh Day of November, 2025

John A. Squires  
*Director of the United States Patent and Trademark Office*